(12) United States Patent
Janakiraman et al.

(10) Patent No.: US 9,138,671 B2
(45) Date of Patent: Sep. 22, 2015

(54) INERTIAL GAS-LIQUID SEPARATOR AND POROUS COLLECTION SUBSTRATE FOR USE IN INERTIAL GAS-LIQUID SEPARATOR

(71) Applicant: Cummins Filtration IP, Inc., Columbus, IN (US)

(72) Inventors: Arun Janakiraman, Janesville, WI (US); Benjamin L. Scheckel, Stoughton, WI (US); Ashwin K. Koleshwar, Stoughton, WI (US); Lee A. Peck, Stoughton, WI (US); Saru Dawar, McFarland, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 14/010,730

(22) Filed: Aug. 27, 2013

(65) Prior Publication Data
US 2014/0059985 A1    Mar. 6, 2014

Related U.S. Application Data

(60) Provisional application No. 61/694,804, filed on Aug. 30, 2012.

(51) Int. Cl.
    *B01D 45/12*      (2006.01)
    *B01D 45/16*      (2006.01)
    (Continued)

(52) U.S. Cl.
    CPC ............... *B01D 45/16* (2013.01); *B01D 45/08* (2013.01); *B01D 46/003* (2013.01); *B01D 50/002* (2013.01)

(58) Field of Classification Search
    CPC ...... B01D 45/08; B01D 50/002; B01D 45/16; G01N 1/2208; F01M 13/04
    USPC ............... 55/459.4, 462–465, 418, 434, 446, 55/DIG. 14, DIG. 19; 73/28.05, 863.22
    See application file for complete search history.

(56) References Cited

U.S. PATENT DOCUMENTS

| | | | |
|---|---|---|---|
| 3,261,925 A | 7/1966 | Smith | |
| 4,012,209 A | 3/1977 | McDowell et al. | |

(Continued)

FOREIGN PATENT DOCUMENTS

| | | |
|---|---|---|
| DE | 1544126 | 6/1969 |
| DE | 10320215 | 9/2004 |

(Continued)

OTHER PUBLICATIONS

Highly Efficient Oil Separation for Minimised Oil Carry Over, MTZ0412008, vol. 69, pp. 32-37.

(Continued)

*Primary Examiner* — Dung H Bui
(74) *Attorney, Agent, or Firm* — Foley & Lardner LLP

(57) ABSTRACT

A gas-liquid separator has a housing having an inlet for receiving a gas-liquid stream and an outlet for discharging a gas stream. A nozzle structure in the housing has a plurality of nozzles that receive the gas-liquid stream and accelerate the gas-liquid stream therethrough to create a plurality of gas-liquid jets. An inertial collector in the housing causes a sharp directional change of the gas-liquid jets, causing separation of liquid particles from the gas-liquid stream to produce the gas stream. The inertial collector has a porous collection substrate. According to the present disclosure, at least one of the following three conditions is met: (a) the porous collection substrate comprises fibers of small diameter and has low packing density; (b) the porous collection substrate comprises oleophobic fibers; and (c) the nozzle structure and the inertial collector are configured to allow for full expansion of the plurality of gas-liquid jets.

28 Claims, 6 Drawing Sheets

(51) Int. Cl.
*B01D 45/08* (2006.01)
*B01D 46/00* (2006.01)
*B01D 50/00* (2006.01)

(56) References Cited

U.S. PATENT DOCUMENTS

| | | | |
|---|---|---|---|
| 4,129,500 A | 12/1978 | Jeffreys et al. | |
| 4,199,447 A | 4/1980 | Chambers et al. | |
| 4,627,406 A | 12/1986 | Namiki et al. | |
| 4,759,782 A | 7/1988 | Miller et al. | |
| 4,888,117 A | 12/1989 | Brown et al. | |
| 5,129,371 A | 7/1992 | Rosalik, Jr. | |
| 5,480,547 A | 1/1996 | Williamson et al. | |
| 5,492,623 A | 2/1996 | Ishibe | |
| 5,562,087 A | 10/1996 | Wright | |
| 5,564,401 A | 10/1996 | Dickson | |
| 5,800,597 A | 9/1998 | Perrotta et al. | |
| 6,279,556 B1 | 8/2001 | Busen et al. | |
| 6,290,738 B1 | 9/2001 | Holm | |
| 6,293,268 B1 | 9/2001 | Mammarella | |
| 6,418,918 B2 | 7/2002 | Mammarella | |
| 6,419,721 B1 | 7/2002 | Hunter | |
| 6,422,396 B1 | 7/2002 | Li et al. | |
| 6,453,758 B1 * | 9/2002 | Marple et al. | 73/863.22 |
| 6,505,615 B2 | 1/2003 | Pietschner | |
| 6,601,385 B2 | 8/2003 | Verdegan et al. | |
| 6,626,163 B1 | 9/2003 | Busen et al. | |
| 6,684,864 B1 | 2/2004 | Busen et al. | |
| 6,740,358 B2 | 5/2004 | Speece et al. | |
| 6,797,040 B2 | 9/2004 | Lenzing | |
| 7,080,636 B2 | 7/2006 | Knaus et al. | |
| 7,198,718 B1 | 4/2007 | Turnbull | |
| 7,238,216 B2 | 7/2007 | Malgorn et al. | |
| 7,297,279 B2 | 11/2007 | Johnson et al. | |
| 7,473,291 B2 | 1/2009 | Evenstad et al. | |
| 7,828,865 B2 | 11/2010 | Hodges et al. | |
| 7,896,946 B1 | 3/2011 | Steffen et al. | |
| 7,938,875 B2 * | 5/2011 | Son et al. | 55/445 |
| 7,964,009 B2 | 6/2011 | Herman et al. | |
| 8,048,212 B2 | 11/2011 | Parikh et al. | |
| 8,075,654 B2 | 12/2011 | Holzmann et al. | |
| 8,118,909 B2 | 2/2012 | Faber et al. | |
| 8,152,884 B1 | 4/2012 | Severance et al. | |
| 8,202,339 B2 | 6/2012 | Janakiraman et al. | |
| 8,241,411 B2 | 8/2012 | Faber et al. | |
| 8,245,498 B2 | 8/2012 | Liu et al. | |
| 8,360,251 B2 | 1/2013 | Wieczorek et al. | |
| 2003/0047074 A1 * | 3/2003 | Liu et al. | 95/268 |
| 2005/0026526 A1 | 2/2005 | Verdegan et al. | |
| 2006/0242933 A1 | 11/2006 | Webb et al. | |
| 2007/0021021 A1 | 1/2007 | Verdegan et al. | |
| 2007/0062886 A1 | 3/2007 | Rego et al. | |
| 2007/0062887 A1 | 3/2007 | Schwandt et al. | |
| 2007/0107399 A1 | 5/2007 | Schwandt et al. | |
| 2007/0131235 A1 | 6/2007 | Janikowski et al. | |
| 2007/0224087 A1 | 9/2007 | Ding | |
| 2007/0256566 A1 | 11/2007 | Faber et al. | |
| 2008/0264018 A1 | 10/2008 | Herman | |
| 2009/0100811 A1 | 4/2009 | Scheckel et al. | |
| 2009/0114088 A1 | 5/2009 | Evenstad et al. | |
| 2009/0193770 A1 | 8/2009 | Holzmann et al. | |
| 2009/0313977 A1 | 12/2009 | Liu et al. | |
| 2010/0024366 A1 | 2/2010 | Hodges et al. | |
| 2010/0050871 A1 | 3/2010 | Moy et al. | |
| 2011/0124941 A1 | 5/2011 | Verdegan et al. | |
| 2011/0139706 A1 | 6/2011 | Kalayci et al. | |
| 2012/0144788 A1 | 6/2012 | Faber et al. | |
| 2012/0192536 A1 | 8/2012 | Severance et al. | |
| 2012/0292252 A1 | 11/2012 | Chase et al. | |

FOREIGN PATENT DOCUMENTS

| | | |
|---|---|---|
| EP | 0754840 | 1/1997 |
| JP | 2011-078928 | 4/2011 |
| WO | 2007000281 | 1/2007 |
| WO | 2007028351 | 3/2007 |
| WO | 2007137934 | 12/2007 |
| WO | 2007138008 | 12/2007 |

OTHER PUBLICATIONS

International Search Report and Written Opinion for International Application No. PCT/US13/56957, dated Jan. 7, 2014, 12 pages.

* cited by examiner

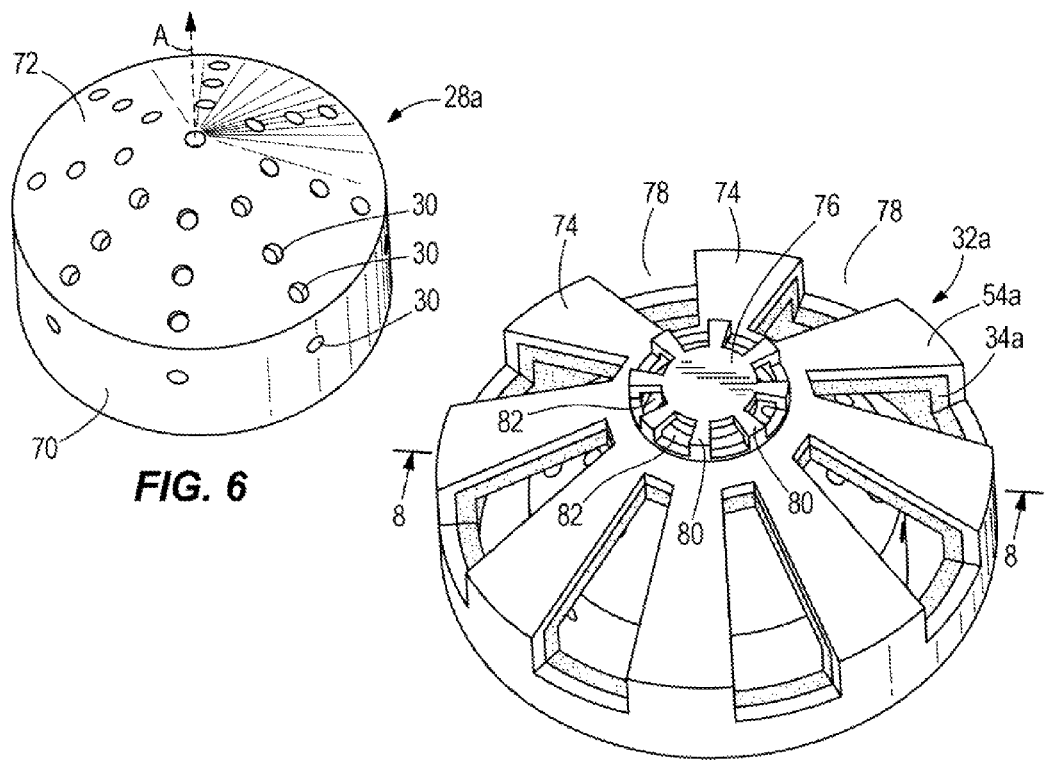
FIG. 6
FIG. 7
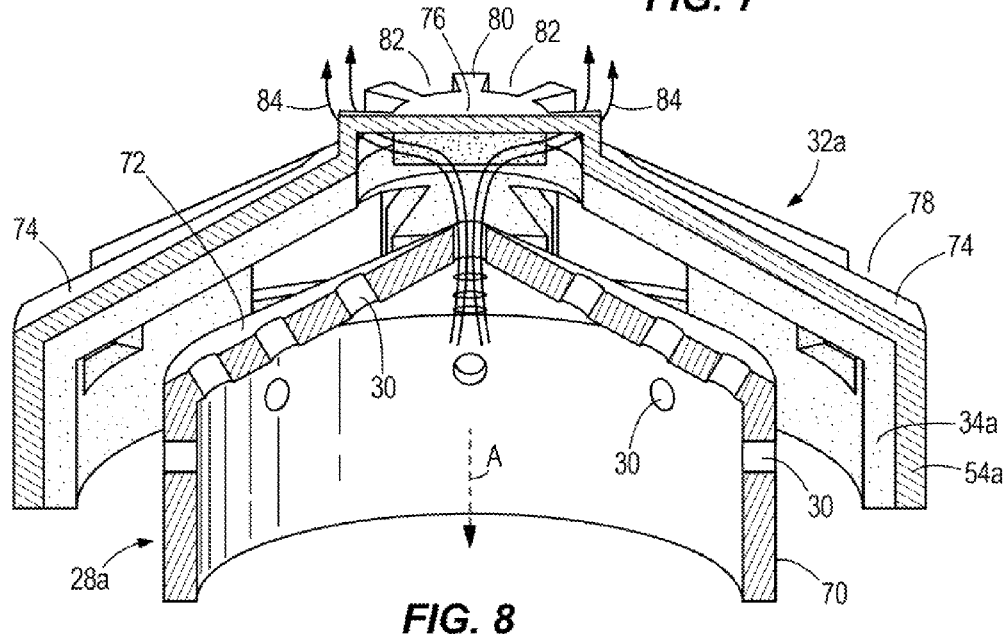
FIG. 8 ly of gas-liquid jets. An inertial collector is in the housing downstream of the plurality of nozzles, the inertial collector causing a sharp directional change of the gas-liquid jets, thereby causing separation of liquid particles from the gas-liquid stream so as to produce the gas stream. The inertial collector comprises a porous collection substrate. According to the present disclosure, at least one of the following three conditions is met: (a) the porous collection substrate comprises fibers of small diameter and has low packing density; (b) the porous collection substrate comprises oleophobic fibers; and (c) the nozzle structure and the inertial collector are configured to allow for full expansion of the plurality of gas-liquid jets.

INERTIAL GAS-LIQUID SEPARATOR AND POROUS COLLECTION SUBSTRATE FOR USE IN INERTIAL GAS-LIQUID SEPARATOR

CROSS-REFERENCE TO RELATED APPLICATION

This application claims the benefit of and priority to U.S. Provisional Application No. 61/694,804, filed Aug. 30, 2012, the disclosure of which is hereby incorporated by reference in its entirety.

FIELD

The present disclosure relates to inertial gas-liquid separators and porous collection substrates for use in inertial gas-liquid separators.

BACKGROUND

U.S. Pat. No. 6,290,738, hereby incorporated by reference in its entirety, discloses an inertial gas-liquid separator including a housing having inlet for receiving a gas-liquid stream and an outlet for discharging a gas stream. A nozzle structure in the housing has a plurality of nozzles receiving the gas-liquid stream from the inlet and accelerating the gas-liquid stream through the nozzles. An inertial collector in the housing in the path of the accelerated gas-liquid stream causes a sharp directional change thereof and in preferred form has a rough porous collection surface causing liquid particle separation from the gas-liquid stream of smaller sized liquid particles titan a smooth non-porous impactor impingement surface and without the sharp cut-off size of the latter, to improve overall separation efficiency including for smaller liquid particles. Various housing configurations and geometries are provided.

U.S. Pat. No. 8,360,251, which is hereby incorporated by reference in its entirety, discloses a coalescing media for coalescing a mixture of two phases, namely a continuous phase and a dispersed phase. The disclosed coalescing media has multiple layers with distinct porosities, where an interior layer of the coalescing media has a higher porosity than the layers immediately adjacent to the interior layer. The disclosed media may be utilized in coalescers, coalescing systems, or coalescing methods for removing the dispersed phase from the mixture.

U.S. Patent Application Publication No. 2010/0050871, which is hereby incorporated by reference in its entirety, discloses a coalescing media for coalescing a mixture of two phases, namely a continuous Phase and a dispersed liquid phase. The media includes polymeric base material haying a surface with asperities, and the surface is heterogeneous with respect to hydrophilicity/hydrophobicity. The media is configured for coalescing a dispersed liquid phase in a continuous phase where a preponderance of the heterogeneous surface is non-wetting with respect to the dispersed liquid phase. The media is configured for capturing droplets of the dispersed liquid phase where a layer of air is trapped at the heterogeneous surface and tips of the asperities extend through the trapped layer and contact the droplets.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

The present disclosure is directed to an inertial gas-liquid separator. The gas-liquid separator comprises a housing having an inlet for receiving a gas-liquid stream and an outlet for discharging a gas stream. A nozzle structure is in the housing downstream of the inlet, the nozzle structure having a plurality of nozzles that receive the gas-liquid stream and accelerate the gas-liquid stream therethrough so as to create a plurality The present disclosure is also directed to a porous collection substrate for use in an inertial gas-liquid separator that separates liquid particles from a gas-liquid stream. The porous collection substrate comprises fibers of small diameter and has low packing density so as to provide high permeability to the porous collection substrate and allow for a gas-liquid jet directed at the porous collection substrate to penetrate the porous collection substrate.

BRIEF DESCRIPTION OF THE DRAWINGS

Examples of inertial gas-liquid separators are described with reference to the following figures. The same numbers are used throughout the figures to reference like features and like components.

FIG. 6 illustrates one embodiment of a nozzle structure for use in an inertial gas-liquid separator according to the present disclosure.

FIG. 7 illustrates one embodiment of an inertial collector associated with the nozzle structure of FIG. 6.

FIG. 8 illustrates a cross-sectional view of the nozzle structure and inertial collector of FIG. 7.

DETAILED DESCRIPTION

Figure 1:
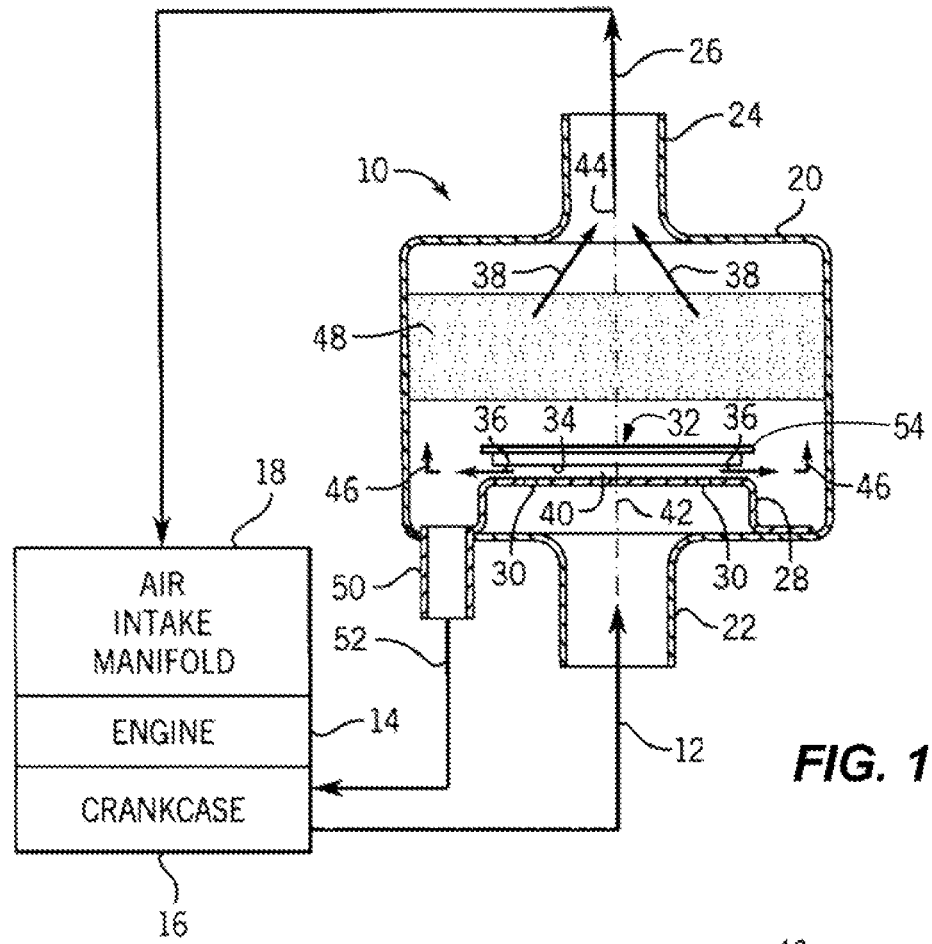
FIG. 1 illustrates one embodiment or an inertial gas-liquid separator according to the present disclosure.

FIG. 1 illustrates an inertial gas-liquid separator 10 for removing and coalescing liquid particles from a gas-liquid stream 12. In the embodiment shown, the gas-liquid separator 10 is used in a crankcase ventilation separation application for an internal combustion engine 14. In such an application, combustion blowby gases are vented from a crankcase 16 of an engine 14. Untreated, the blowby gases contain particulate matter in the form of oil mist and soot, as well as other contaminants. The crankcase ventilation system controls the concentration of the contaminants before they are released to the atmosphere or rerouted back into the engine's air intake system, for example at air intake manifold 18. The oil mist droplets are generally less than 5μ in diameter, and hence are difficult to remove using conventional fibrous filter media, while at the same time maintaining low flow resistance as the media collects and becomes saturated with oil and contaminants.

Inertial gas-liquid separator 10 includes a housing 20 having an inlet 22 for receiving a gas-liquid stream 12 from engine crankcase 16 and an outlet 24 for discharging a gas stream 26, in the example shown, to air intake manifold 18. A nozzle structure 28 is situated in the housing 20 downstream of the inlet 22. The nozzle structure 28 has a plurality of nozzles 30 that receive the gas-liquid stream 12 and accelerate the gas-liquid stream 12 therethrough so as to create a plurality of gas-liquid jets. An inertial collector 32 is situated in the housing 20 in the path of the accelerated gas-liquid jets and causes a sharp directional change thereof as shown at 36. The sharp directional change causes separation of liquid particles from the gas-liquid stream so as to produce the gas stream, because the liquid particles within the gas-liquid stream cannot change direction as quickly as the gas in the gas-liquid stream, and so are inertially collected on the inertial collector 32.

The inertial collector 32 comprises an impaction plate 54 coupled to a porous collection substrate 34 that causes liquid particle separation from the gas-liquid stream of smaller sized liquid particles than a smooth non-porous impactor impingement surface and without the sharp cut-off size of the latter.

The noted porous collection substrate 34 improves overall separation efficiency including for liquid particles smaller than the cut-off size, such as for example the 50% ($d_{50}$) cut-off size, of a smooth non-porous impactor impingement surface. The porous collection substrate 34 causes both: a) liquid particle separation from the gas-liquid stream; and b) collection of the liquid particles within the porous collection substrate 34. The porous collection substrate 34 has a cut-off size for particle separation which is not as sharp as that of a smooth non-porous impactor impingement surface but improves collection efficiency for particles smaller than the cut-off size as well as a reduction in cut-off size. The porous collection substrate 34 provides a coalescing medium, such that liquid particles, once captured within the porous collection substrate 34, will coalesce with other liquid particles in the porous collection substrate 34, and such that the accelerated gas-liquid jets and resultant high velocity of gas at and within the porous collection substrate 34 creates drag forces sufficient to cause captured liquid to migrate to the outer edges of the porous collection substrate 34 and shed off of the inertial collector 32.

After the noted sharp directional change at 36, outlet 24 receives the gas stream, as shown at 38, absent the separated liquid particles. Porous collection substrate 34 and nozzles 30 are separated by a gap 40 that is sufficient to avoid excessive restriction, but small enough that that the gas-liquid jets do not diffuse prior to hitting the porous collection substrate 34. Housing 20 has a flow path therethrough including a first flow path portion 42 for the gas-liquid stream between inlet 22 and gap 40, and a second flow path portion 44 for the gas stream between gap 40 and outlet 24. The flow path through housing 20 has a directional change in gap 40 at porous collection substrate 34, and another directional change in the noted second flow path portion 44, as shown at 46.

A pass-through filter 48, FIG. 1, in the noted second flow path portion 44 provides a back-up safety filter trapping liquid particles re-entrained in the gas stream after separation at inertial collector 32. Drain 50 in the housing drains separated fluid from the gas-liquid separator 10. In FIG. 1, drain 50 drains the separated fluid externally of housing 20 as shown at 52 back to crankcase 16, FIG. 1. Drain 50 is gravitationally below and on the opposite side of inertial collector 32 from pass-through filter 48. In FIG. 1, gas stream 26 flows along a vertical axial direction. Pass-through filter 48 extends along a radial left-right horizontal span perpendicular to the noted vertical axial direction. The noted radial horizontal span of pass-through filter 48 extends across the entire housing 20 and is parallel to porous collection substrate 34. The gas stream flows radially at 36 along and parallel to porous collection substrate 34 after separation and then turns at least 90° as shown at 46 and flows through pass-through filter 48 to outlet 24 as shown at 38.

Figure 2:
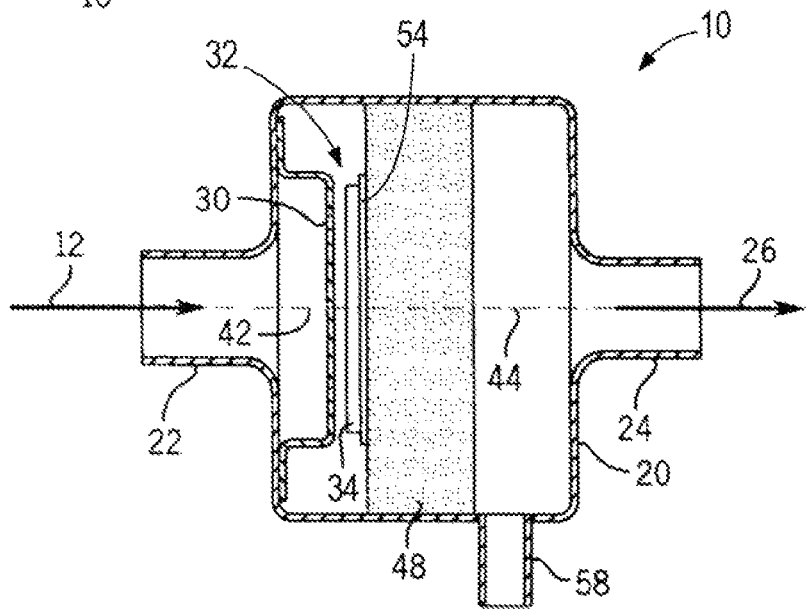
FIG. 2 illustrates another embodiment of an inertial gas-liquid separator according to the present disclosure.

FIG. 2 uses like reference numerals from above where appropriate to facilitate understanding. In FIG. 2, the axial flow of the gas stream 26 through the housing 20 is horizontal. Drain 58 in the housing 20 drains separated fluid from the gas-liquid separator 10 externally of the housing 20 back to crankcase 16. Drain 58 is in the noted second flow path portion 44 and drains separated fluid from inertial collector 32 through pass-through filter 48 such that pass-through filter 48 filters both gas stream 26 and the separated fluid. Drain 58 is between pass-through filter 48 and outlet 24, and is gravitationally below inertial collector 32, outlet 24, and pass-through filter 48.

According to the presently disclosed gas-liquid separator 10, at least one of the following conditions is met: (a) the porous collection substrate 34 comprises fibers of small diameter and has low packing density; (b) the porous collection substrate 34 comprises oleophobic fibers; and (c) the nozzle structure 28 and inertial collector 32 are configured to allow for full expansion of the plurality of gas-liquid jets.

Figure 3:
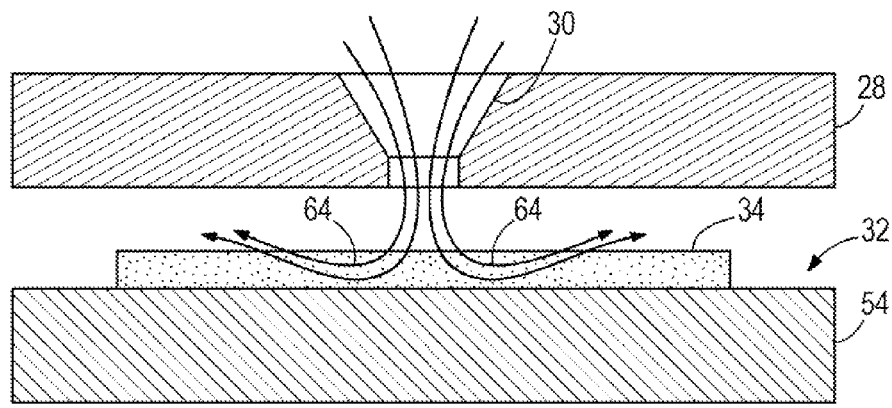
FIG. 3 illustrates one embodiment of a porous collection substrate of an inertial collector for an inertial gas-liquid separator according to the present disclosure.

Now with reference to FIG. 3, one embodiment of an inertial collector 32 will be described. It should be noted that the orientation of the nozzle structure 28 and inertial collector 32 are flipped in comparison to the orientation shown in FIG. 1. As shown in FIG. 3, the gas-liquid stream is accelerated through a nozzle 30 in the nozzle structure 28. The gas-liquid stream is accelerated towards the porous collection substrate 34, which is coupled to the impaction plate 54. The porous collection substrate 34 has high permeability, thereby allowing the gas-liquid jets to penetrate the porous collection substrate 34. In one embodiment, the permeability of the porous collection substrate 34 is at least 3.0 e-10 $m^2$. In another embodiment, the permeability is at least 4.5 e-10 $m^2$. As shown by the arrows 64, the high permeability of the porous collection substrate 34 allows the gas-liquid jets to penetrate the media of the porous collection substrate 34. The porous collection substrate 34 acts a filter with its own separation characteristics. In other words, within the porous collection substrate 34, inertial impaction takes place, and liquid particles are impacted against the fibers of the porous collection substrate 34. Interception and diffusion also occur within the media of the porous collection substrate 34. The liquid particles then coalesce within the media of the porous collection substrate 34. The high permeability of the porous collection substrate 34 therefore causes further separation of liquid from the gas-liquid stream beyond the separation caused by the sharp directional change as shown at 36 and described hereinabove (FIG. 1), and increases the efficiency of the gas-liquid separator 10.

Several properties of the media of the porous collection substrate 34 contribute to the separation efficiency of the gas-liquid separator 10. Generally, a higher media permeability correlates with a higher separation efficiency for a given pressure drop across the nozzle structure 28. In order to vary the permeability, the fiber diameter and packing density of the media of the porous collection substrate 34 can be varied. Generally, a smaller fiber diameter and a lower packing density lead to a higher separation efficiency for an equivalent pressure drop, as described herein below. Additionally, inertial impaction within the media of the porous collection substrate 34 is a function of both fiber diameter and the velocity distribution of the gas-liquid jet within the media. A higher velocity within the media correlates to a higher separation efficiency. The highest velocity of the gas-liquid jets occurs nearest the surface of the porous collection substrate 34. Therefore, increased separation efficiency can be provided by modifying properties of the media of the porous collection substrate 34 near its surface, where the velocity is highest and inertial impaction is greatest.

Figure 4:
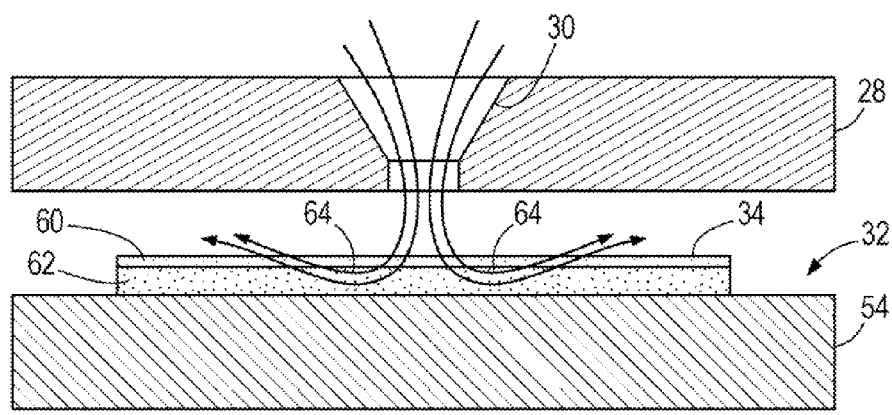
FIG. 4 illustrates another embodiment of a porous collection substrate of an inertial collector.

Now with reference to FIG. 4, an embodiment of the inertial collector 32 in which the porous collection substrate 34 comprises fibers of small diameter and has low packing density will be described. In such an embodiment, the diameter of the fibers and packing density of the media is selected so as to maintain high permeability of the porous collection substrate 34. Generally, in order to achieve the objectives of the present disclosure, the fibers can have a diameter of between 10 micrometers and 70 micrometers and the packing density of the media can be less than 0.2. In one example, the diameter of the fibers is 18.6 micrometers and the packing density is 0.05. In the embodiment shown, the porous collection substrate 34 comprises at least one layer of fibers having low packing density upstream of at least one layer of fibers having high permeability. In the embodiment shown, the porous collection substrate 34 comprises a low packing density nanofiber coating 60 backed by a high permeability backing media 62. The nanofiber coating 60 comprises fibers having even smaller diameter, more specifically one thousand times smaller diameter, than the micrometer-sized fibers described above. The backing media 62 provides support for the nanofiber coating 60. This embodiment changes the surface characteristics of the porous collection substrate 34 without changing the overall permeability of the porous collection substrate 34. By applying the nanofiber coating 60, it is possible to improve the efficiency of separation of liquid particles from the gas-liquid stream over the embodiment shown in FIG. 3. In an embodiment where the nanofiber coating 60 has almost the same permeability as the backing media 62, the overall velocity distribution of the gas-liquid jet is unchanged, but efficiency of separation of liquid particles from the gas-liquid stream is improved due to the low packing density and small fiber diameter of the nanofiber coating 60.

Now with reference to FIG. 5, another embodiment of the inertial collector 32 will be described. In this embodiment, the impaction plate 54 is coated with a plurality of layers of fibers 66. The fiber diameter and packing density of each successive layer of fibers in the plurality of layers of fibers 66 increase from a most upstream layer of fibers 66a to a most downstream layer of fibers 66d. In the embodiment shown, the most downstream layer of fibers 66d is backed by a high permeability backing media 62. Since it is not possible to decrease the media packing density to zero because such a media would not he able to support itself, a multi-layer media having successive layers 66a-66d of increasing packing density provides support to each media layer in succession. Layers of successively increasing fiber diameter and packing density from upstream to downstream (i.e., in the direction of arrow 68) provides increased separation efficiency of liquid from the gas-liquid stream.

Now turning to FIGS. 6-13, embodiments of the gas-liquid separator 10 in which the nozzle structure 28 and the inertial collector 32 are configured to allow for full expansion of the plurality of gas-liquid jets will be described.

FIG. 6 shows one embodiment of a nozzle structure 28a. The nozzle structure 28a comprises a conical portion 72 downstream of a cylindrical portion 70. The conical portion 72 slopes convexly upwardly from a diameter (outer edge) of the cylindrical portion 70 toward a central axis A. A plurality of nozzles 30 are provided through the nozzle structure 28a. In the embodiment shown, a plurality of nozzles 30 are provided through the conical portion 72 along lines that radiate from the central axis A of the nozzle structure 28a. Along each line that radiates from the central axis A, the nozzles 30 are similarly spaced from one another such that they are provided in concentric circles around the central axis A of the nozzle structure 28a. A plurality of nozzles 30 are also provided through the cylindrical portion 70 of the nozzle structure 28a, and are radially aligned with the nozzles 30 provided in the conical portion 72, as well as provided in a concentric circle around central axis A. Aligning the nozzles 30 on the conical portion 72, as shown in this embodiment, increases the inter-nozzle spacing for a given pressure drop across the gas-liquid separator 10, as compared to a nozzle structure 28 having a cylindrical portion with a downstream planar portion (see FIGS. 1 and 2) of the same diameter and having the same size and number of nozzles 30 as the conical portion 72 shown herein. In the embodiment shown in FIG. 6, as compared to that of FIGS. 1 and 2, the gas-liquid jets are capable of expanding more after deflection by the inertial collector 32a due to the increased inter-nozzle spacing provided by the conical shape of the conical portion 72 of the nozzle structure 28a. Increased inter-nozzle spacing lessens interference of the jets with one another when they encounter the porous collection substrate 34a, the effect of which is more fully described herein below.

As shown in FIG. 7, an inertial collector 32a can be designed to allow for more full expansion of the gas-liquid jets as well. The inertial collector 32a comprises a porous collection substrate 34a coupled to an impaction plate 54a. The inertial collector 32a has a plurality of spokes 74 radiating from a central portion 76 thereof. The plurality of nozzles 30 through the nozzle structure 28a are aligned with the plurality of spokes 74 of the inertial collector 32a. The radiating spokes 74 create a plurality of slots 78 through the inertial collector 32a, which slots 78 allow for fuller expansion of the gas-liquid jets when the gas-liquid jets hit the inertial collector 32a. The central portion 76 of the inertial collector 32a comprises a circular plate also having a plurality of spokes 80 radiating therefrom. These spokes 80 create slots 82, which slots 82 also allow for fuller expansion of the gas-liquid jets when the gas-liquid jets hit the inertial collector 32a. The gas-liquid jets expand across the full width of each spoke 74, 80 of the inertial collector 32a. This allows for filtration of the liquid particles from the gas-liquid jets by inertial impaction and coalescence occurring within the media of the porous collection substrate 34a itself as described hereinabove, as the jets are not confined by interfering with one another as they expand across the media.

The slots 78, 82 also cause a sharp directional change of the gas-liquid jets, as shown by arrows 84, FIG. 8, beyond the sharp directional change of the gas-liquid jets upon hitting the inertial collector 32a, as shown by arrow 36 in FIG. 1, which provides secondary filtration of the gas-liquid jets. By providing the slots 78, 82 it is possible to increase filtration within the media of the porous collection substrate 34, due to the sharp directional change of the gas-liquid jets necessitated by the slots 78, 82.

Figure 9:
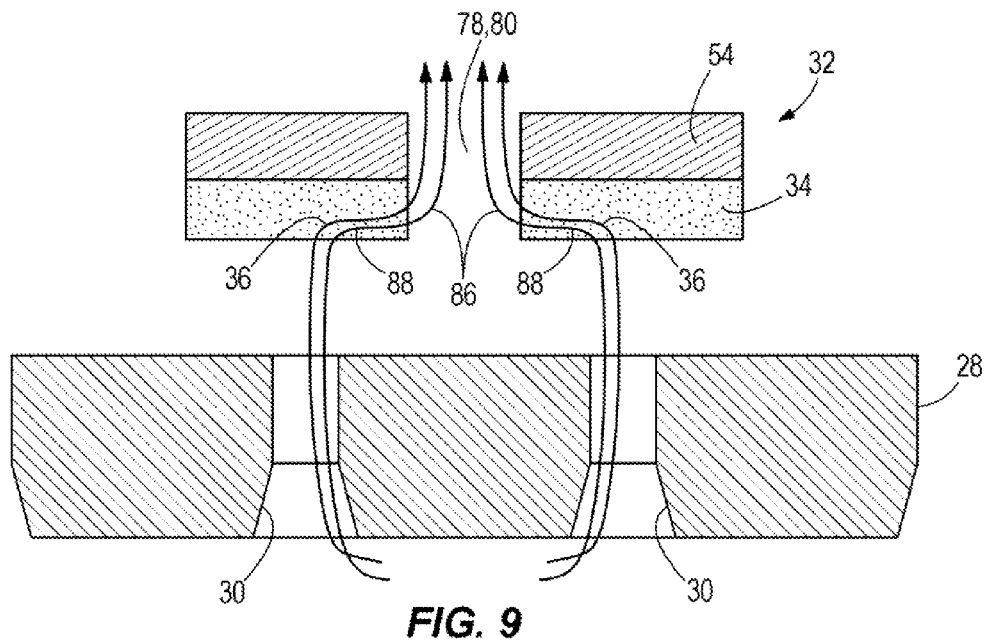
FIG. 9 is a schematic depicting flow of a gas-liquid stream through a plurality of nozzles in one embodiment of a nozzle structure according to the present disclosure.

Now, with reference to FIG. 9, the effect of the sharp directional change at 84, FIG. 8, will be further described. As shown by arrows 86, FIG. 9, a given gas-liquid jet not only takes a (first) sharp directional change upon hitting the inertial collector 32, as shown at 36 and as described hereinabove with reference to arrow 36 in FIG. 1, but also encounters an additional (second) sharp directional change, as shown at 86, in order to exit through the slots 78, 82. This causes more of the flow of the gas-liquid jet to be through the media of the porous collection substrate 34 as shown at 88, which increases inertial impaction and eventual coalescence within the media of the porous collection substrate 34, as described hereinabove. The sharp directional change at 86, FIG. 9, corresponds to the sharp directional change at 84, FIG. 8.

Figure 10:
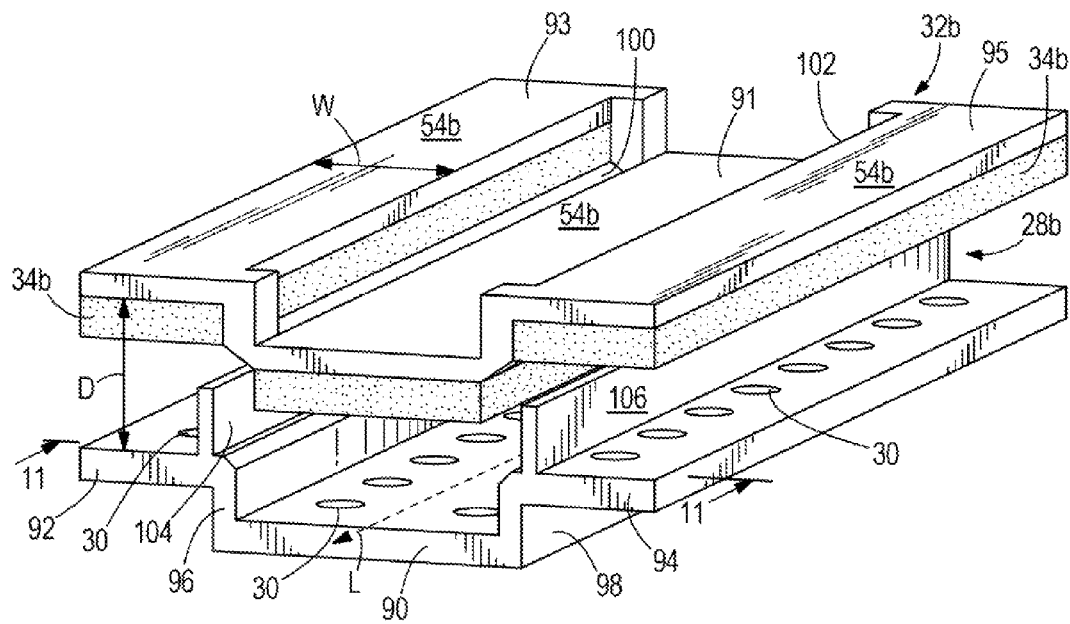
FIG. 10 illustrates another embodiment of a nozzle structure and an inertial collector according to the present disclosure.
Figure 11:
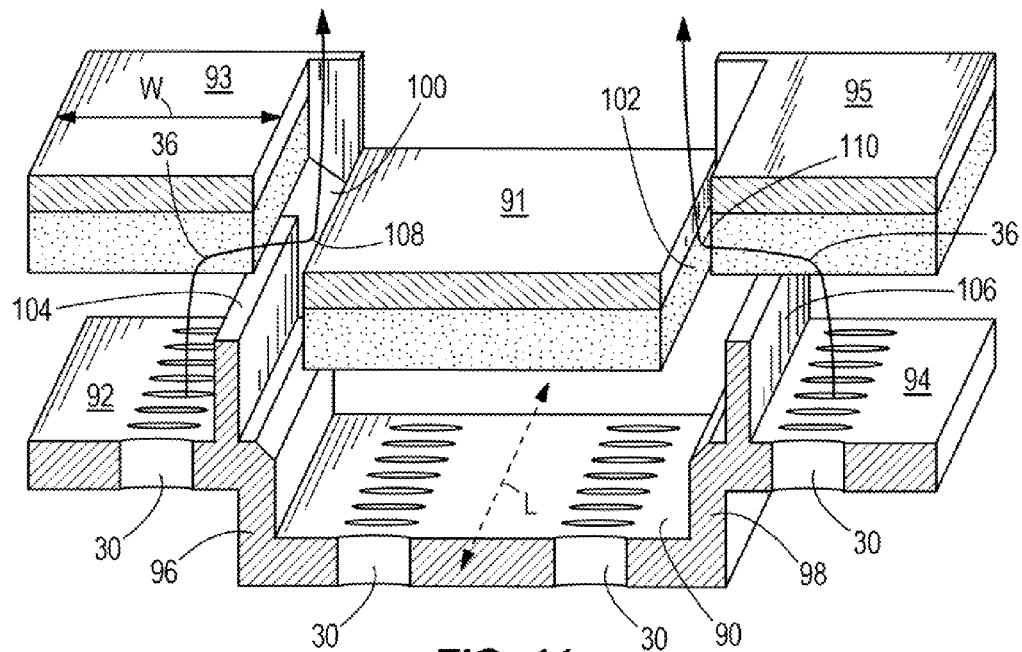
FIG. 11 is a cross-sectional view of the nozzle structure and inertial collector of FIG. 10.

Now turning to FIGS. 10 and 11, another embodiment of a nozzle structure 28b and inertial collector 32b with impaction plate 54b and porous collection substrate 34b will be described. The nozzle structure 28b comprises a stepped configuration, in one embodiment, such that a plurality of nozzles 30 are provided on different planes. in one embodiment, the different planes of the stepped configuration are parallel to one another. For example, the nozzle structure 28b comprises a first plate 90 located on a first plane and second and third plates 92, 94 located on either side of the first plate 90. The first plate 90 is connected to the second and third plates 92, 94 by fourth and fifth plates 96, 98 extending perpendicularly to each of the first, second, and third plates 90, 92, 94, respectively. In one embodiment, the second and third plates are located on a second plane. In the embodiment shown, the second and third plates 92, 94 are on the same plane that is different from the plane of the first plate 90. The second and third plates 92, 94 extend outwardly away from the first plate 90 with respect to a longitudinal axis L of the nozzle structure 28b.

The plurality of nozzles 30 may be provided in rows that are parallel to the longitudinal axis L of the nozzle structure 28b. For example, two rows of nozzles may be provided on the first plate 90, one row of nozzles 30 is provided on the second plate 92, and one row of nozzles 30 is provided on the third plate 94. Alternative plate configurations, nozzle configurations, and fewer or more rows of nozzles can be provided other than shown herein.

The inertial collector 32b comprises a stepped configuration that is offset from and corresponds to the stepped configuration of the nozzle structure 28b. For example, the inertial collector 32b is offset by a distance D from the nozzle structure 28b. This distance D corresponds to the gap 40, described above with reference to FIG. 1. Inertial collector 32b comprises first, second, and third plates 91, 93, 95 that are each offset by the distance D from the first, second and third plates 90, 92, 94 of the nozzle structure 28b, respectively. In the embodiment shown, the second and third plates 93, 95 are located on either side of the first plate 91. Porous collection substrate 34b is provided on each of the plates 91, 93, 95. At least one slot 100, 102 is provided between the first plate 91 and the second plate 93 and between the first plate 91 and the third plate 95. A first slot 100 is provided between the first plate 91 and the second plate 93. A second slot 102 is provided between the first plate 91 and the third plate 95. Slot 100 is situated above fourth plate 96 of the nozzle structure 28b. Slot 102 is situated above fifth plate 98 of the nozzle structure 28b.

The nozzle structure 28b also comprises one or more posts 104, 106 extending from the nozzle structure 28b toward the inertial collector 32b. A first post 104 extends perpendicularly to the first plate 90 and parallel to the fourth plate 96. The first post 104 is offset laterally from the fourth plate 96 and extends from an opposite side of the second plate 92 than does the fourth plate 96. A second post 106 extends perpendicularly to the first plate 90 and parallel to the fifth plate 98. The second post 106 is offset laterally from the fifth plate 98 and extends from an opposite side of the third plate 94 than does the fifth plate 98. Posts 104, 106 extend adjacent the slots 100, 102, respectively, and cause an additional (second) sharp directional change in the gas-liquid stream before the gas-liquid stream exits the slots 100, 102. For example, first post 104 causes a sharp directional change of the gas-liquid stream as shown at arrow 108, FIG. 11, before the gas-liquid stream exits slot 100. Second post 106 causes a sharp directional change as shown at arrow 110 before the gas-liquid stream exits slot 102. These sharp directional changes at 108 and 110 are in addition to the sharp directional change at 36, described herein above with respect to FIGS. 1 and 9. These second sharp directional changes shown at 108 and 110 provide secondary filtration, described above with reference to FIG. 9.

Now turning to FIGS. 12 and 13, another embodiment of a nozzle structure 28c and corresponding inertial collector 32c will be described. As shown in FIG. 13, the nozzle structure 28c comprises a first plate 112 located on a first plane and a second plate 114 located on a second plane and radially outwardly of the first plate 112. In the embodiment shown, the first plate 112 comprises a circular plate, and the second plate 114 comprises a ring having an inner diameter D1 that corresponds to an outer diameter of the first plate 112. The first plate 112 is connected to the second plate 114 by a third plate 116 extending perpendicularly to each of the first and second plates 112, 114. In the embodiment shown, the third plate 116 comprises a cylindrical structure having an outer diameter that is the same diameter D1 as the inner diameter of the second plate 114 and the outer diameter of the first plate 112. Further, in the embodiment shown, a fourth plate 118 is provided. The fourth plate 118 comprises a ring having an inner diameter D2 corresponding to an outer diameter of the second plate 114. The fourth plate 118 is connected to the second plate 114 by a fifth plate 120, which is perpendicular to both the second and fourth plates 114, 118, and comprises a cylindrical structure having an outer diameter that is the same as the diameter D2. Each of the first, second, and fourth plates 112, 114, 118 comprises a plurality of nozzles 30 extending therethrough. In the embodiment shown, the nozzles 30 are coaxially aligned with a central axis A' of the nozzle structure 28d.

Figure 12:
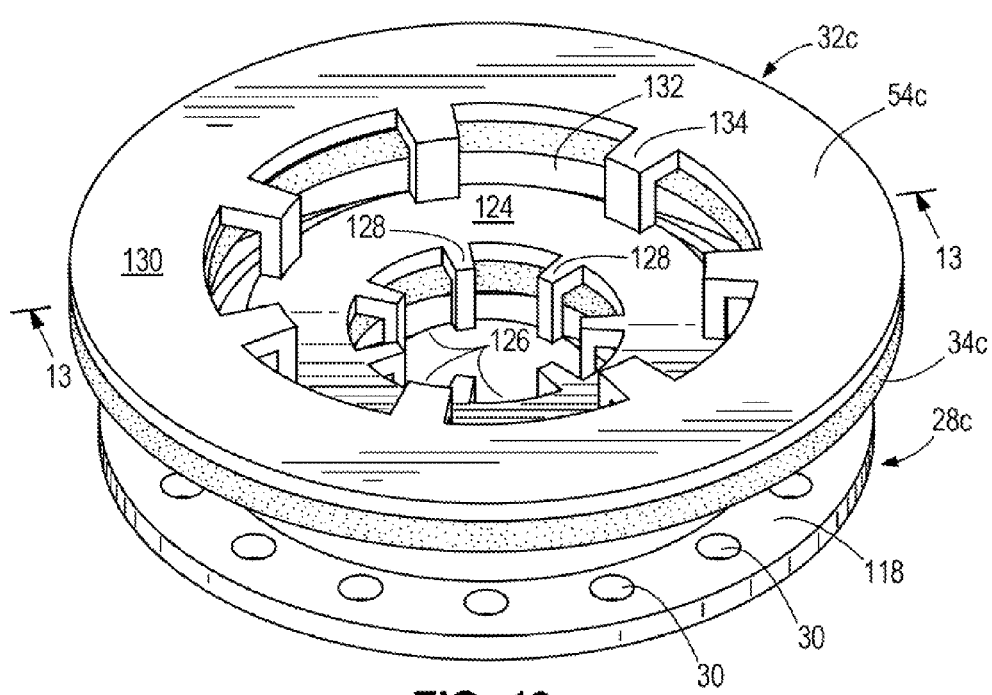
FIG. 12 illustrates another embodiment of a nozzle structure and an inertial collector according to the present disclosure.
Figure 13:
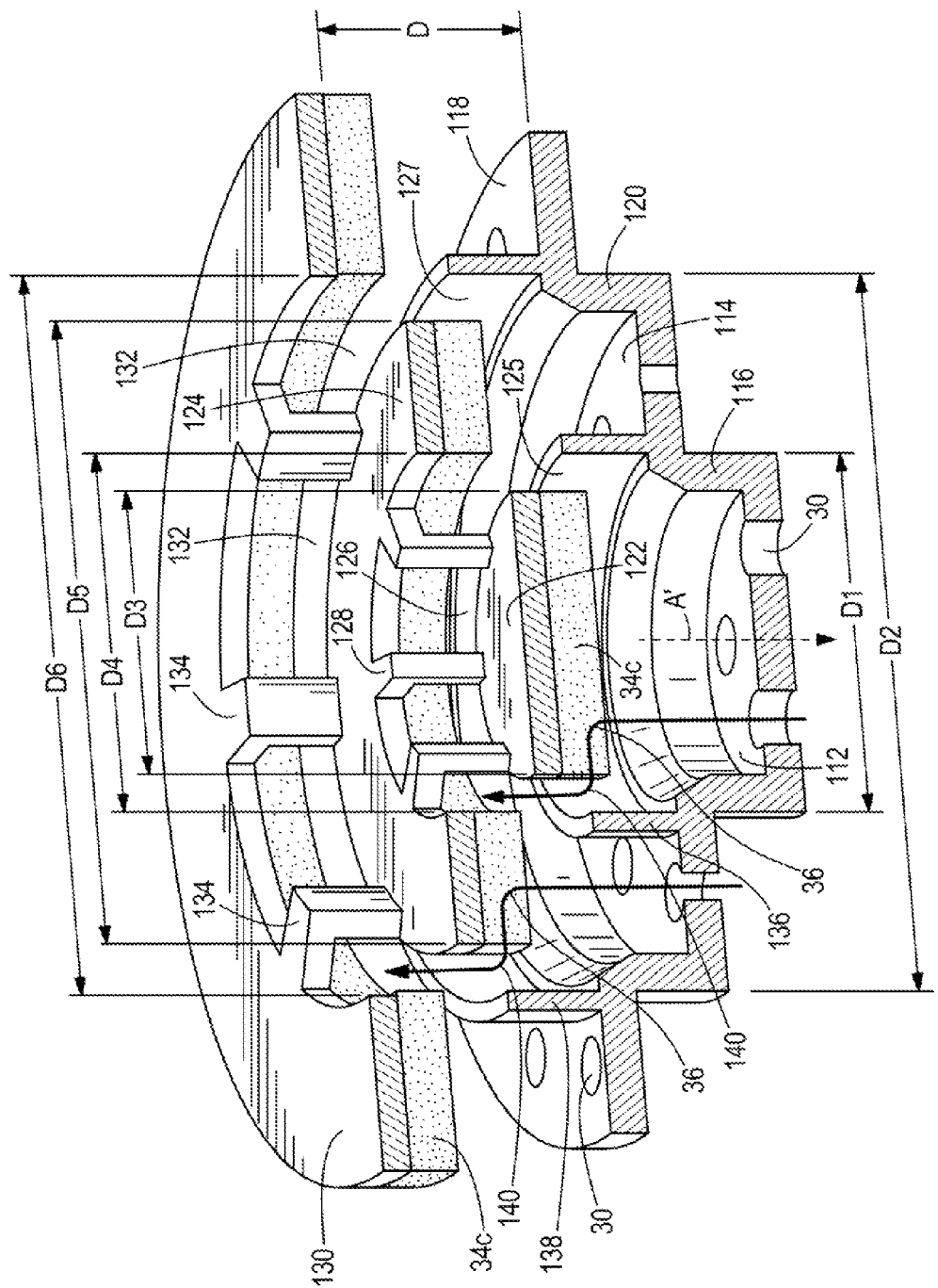
FIG. 13 is a cross-sectional view of the nozzle structure and inertial collector of FIG. 12.

In the embodiments of FIGS. 12 and 13, the inertial collector 32c comprises a stepped configuration that is offset from and corresponds to the stepped configuration of the nozzle structure 28c. The inertial collector 32c is offset from the nozzle structure 28c by the distance D, which corresponds to the gap 40, see FIG. 1. The inertial collector 32c comprises a first plate 122 located on a first plane. The inertial collector 32c comprises a second plate 124 located on a second plane and radially outwardly of the first plate 122. At least one slot 126 is provided between the first plate 122 and the second plate 124. The at least one slot 126 is provided between posts 128 that connect the first plate 122 to the second plate 124. In the embodiment shown, the first plate 122 comprises a circular structure downstream of and aligned with the circular structure of the first plate 112 of the nozzle structure 28c. The first plate 122 of the inertial collector 32a has a diameter D3 that is less than the inner diameter D1 of the second plate 114 of the nozzle structure 28c. This difference in diameter creates a gap 125 between the first plate 122 of the inertial collector 32a and the second plate 114 of the nozzle structure 28c. The gap 125 allows for flow of the gas stream there through after the gas-liquid jets have hit the first plate 122 of the inertial collector 32c. The gas stream flows from the gap 125 through the slots 126, and eventually along the noted second flowpath portion 44, FIG. 1.

The second plate 124 comprises a ring having an inner diameter D4 that is greater than the outer diameter D3 of the circular first plate 122. The ring of the second plate 124 has an outer diameter D5. The difference in the diameters D3 and D4 provides the above-noted slots 126. The posts 128 connect the first and second plates 122, 124 from the outer diameter D3 of the first plate 122 to the inner diameter D4 of the second plate 124. A third plate 130 is provided radially outwardly of the second plate 124 and comprises a ring having an inner diameter D6 that is greater than the outer diameter D5 of the second plate 124. At least one slot 132 is provided between the second plate 124 and the third plate 130. The at least one slot 132 is provided between posts 134 that connect the third plate 130 to the second plate 124 at the outer diameter D4 of the second plate 124. The at least one slot 132 is provided by the difference between the outer diameter D5 of the second plate 124 and the inner diameter D6 of the third plate 130. The posts 134 connect the second and third plates 124, 130 from the outer diameter D5 of the second plate 124 to the inner diameter D6 of the third plate 130. The outer diameter D5 of the second plate 124 of the inertial collector 32c is less than the outer diameter D2 of the second plate 114 of the nozzle structure 28c. This creates a gap 127 that allows for flow of the gas stream there through after the gas-liquid jets have hit the second plate 124 of the inertial collector 32c. The gas stream flows from the gap 127 through the slots 132, and eventually along the noted second flowpath portion 44, FIG. 1.

A porous collection substrate 34c is provided on the inertial collector 32c and receives the gas-liquid stream from the plurality of nozzles 30 in each plate 112, 114, 118 of the nozzle structure 28c. The nozzle structure 28c comprises one or more walls 136, 138 extending from the nozzle structure 28c toward the inertial collector 32c. In the embodiment shown herein, the walls 136, 138 comprise cylindrical structures having roughly the diameter of the plate from which they extend. For example, wall 136 has roughly the diameter D1 of first plate 112 and wall 138 has roughly the outer diameter D2 of second plate 114. The walls 136, 138 extend adjacent the slots 126, 132 and cause an additional sharp directional change in the gas-liquid stream before the gas-liquid stream exits the slots 126, 132, as shown by the arrows 140. This sharp directional change at 140 is in addition to the sharp directional change at 36, as described above with respect to FIGS. 1 and 9. This additional (second) sharp directional change at 140 causes the secondary filtration described hereinabove with respect to FIG. 9.

Provision of an inertial collector 32b, 32c having plates on multiple planes also allows for full expansion of the plurality of gas-liquid jets. Each gas-liquid jet is less hindered as a result of having fewer neighboring gas-liquid jets than in alternative configurations, and can expand fully over more surface area of the porous collection substrate 34b, 34c than in alternative configurations. For example, a gas-liquid jet in the embodiment of FIGS. 10 and 11 can expand laterally over the entire width W of the second plate 93. Although neighboring jets in the longitudinal direction L may prevent full expansion in the longitudinal direction L, spacing of the nozzles 30 could be designed to allow for such expansion depending on a desired pressure drop and space constraints. The width W could be designed such that the gas-liquid jet encounters the second sharp directional change as shown at 108 just as the decreasing velocity of the gas-liquid jet (due to hindrance within the media of the porous collection substrate 34b) begins to no longer have as much of an impact on inertial impaction within the porous collection substrate 34b. Similarly, the gas-liquid jets in the embodiment of FIGS. 12 and 13 can fully expand due to less hindrance from neighboring gas-liquid jets. For example, a gas-liquid jet can expand radially (with respect to the axis A') across the entire width (from D4 to D5) of the second plate 124. A gas-liquid jet can expand radially across the entire width of the third plate 130 as well. The nozzles 30 could also be spaced in this embodiment to allow for more full expansion in the circumferential direction. Allowing for full expansion of the gas-liquid jets increases efficiency because the gas-liquid jets can maintain a higher velocity over a larger portion of the media. Allowing for full expansion also increases efficiency because the gas-liquid jet travels longer through the media, which increases separation by inertial impaction, interception, and diffusion within the media, all of which contribute to further removal of liquid particles from the gas-liquid jet beyond that provided by initial inertial impaction with the inertial collector 32.

Any of the embodiments shown hereinabove in FIGS. 1-13 can comprise a porous collection substrate 34 having fibers that are treated such that they are oleophobic and resist plugging by oil. A liquid-saturated media increases the packing density of the media, decreases permeability, and alters the velocity distribution of the gas-liquid jets, all of which contribute to decreased separation efficiency. Oleophobic fibers may prevent saturation of the media of the porous collection substrate 34 with liquid panicles by decreasing the affinity of fiber surfaces to the captured liquid oil. Effectively, oleophobic fibers can maintain the properties of a new media, such that packing density and permeability of the media remain relatively unchanged throughout the life of the media. In one embodiment, the oleophobic fibers comprise an inherently oleophobic polymer. The inherently oleophobic polymer may comprise a fluorocarbon polymer, a hydrophobic polyester, or a polysulfone. For example, the inherently oleophobic polymer may comprise polytetrafluoroethylene or polybutylene terphthalate. Alternatively, the oleophobic fibers may comprise a base polymer treated with an oleophobic coating. In other embodiments, glass, metal, ceramic, or carbon fiber media can be treated with an oleophobic coating. The oleophobic coating may comprise a fluorocarbon resin, a silicone resin, or a surfactant. The surfactant may comprise a polysiloxane such as a hydroxy-terminated polydimethylsiloxane. In another embodiment, the oleophobic fibers comprise plasma treated fibers, such as disclosed in U.S. Patent Application Publication No. 2010/0050871, incorporated by reference hereinabove in its entirety.

It should be understood that any of the above embodiments that already meet one of conditions (a), (b), and/or (c) could be provided in combination with any of the other conditions. One condition may be provided, two conditions may be provided, or all three conditions may be provided.

The present disclosure therefore relates to a porous collection substrate 34 for use in an inertial gas-liquid separator 10 that separates liquid particles from as gas-liquid stream. The porous collection substrate 34 comprises fibers of small diameter and has low packing density so as to provide high permeability to the porous collection substrate 34 and allow for a gas-liquid jet directed at the porous collection substrate 34 to penetrate the porous collection substrate 34. For example, as shown in FIG. 4, the porous collection substrate 34 may comprise at least one layer of fibers having low packing density upstream of at least one layer of fibers having high permeability. In one embodiment, the fibers have a diameter of between 10 micrometers and 70 micrometers. In one embodiment, the packing density of the porous collection substrate is less than 0.2. In one embodiment, the permeability of the porous collection substrate is at least $3.0\,e\text{-}10\,m^2$. In another embodiment, the layer of fibers having low packing density may comprise a nanofiber coating 60 and the layer of fibers having high permeability may comprise a high permeability backing media 62.

Figure 5:
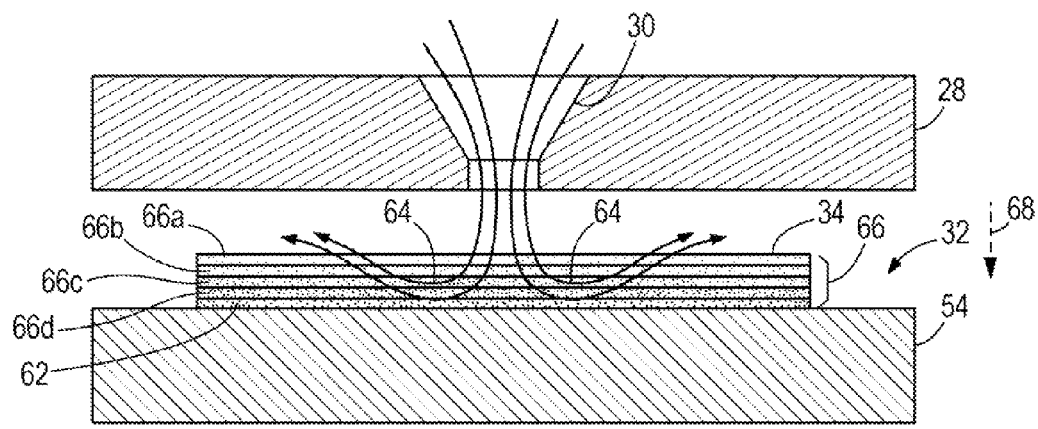
FIG. 5 illustrates another embodiment of a porous collection substrate of an inertial collector.

In another embodiment, as shown in FIG. 5, the porous collection substrate 34 may further comprise a plurality of layers of fibers 66, wherein the fiber diameter and packing density of each successive layer of fibers in the plurality of layers of fibers 66 increases from a most upstream layer of fibers 66a to a most downstream layer of fibers 66d, and wherein the most downstream layers of fibers 66d is backed by high permeability backing media 62.

The porous collection substrate 34 may further comprise oleophobic fibers that prevent saturation of the porous collection substrate 34 with liquid particles, as described herein above.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to he expected that various equivalents, alternatives and modifications are possible within the scope of the appended claims. Each limitation in the appended claims is intended to invoke interpretation under 35 U.S.C. §112(f), only if the terms "means for" or "step for" are explicitly recited in the respective limitation.

What is claimed is:

1. An inertial gas-liquid separator, the gas-liquid separator comprising:
a housing having an inlet for receiving a gas-liquid stream and an outlet for discharging a gas stream;
a nozzle structure in the housing downstream of the inlet, the nozzle structure including a cylindrical portion and a conical portion, the nozzle structure having a plurality of nozzles that receive the gas-liquid stream and accelerate the gas-liquid stream therethrough so as to create a plurality of gas-liquid jets, a first portion of the plurality of nozzles being positioned on the conical portion and a second portion of the plurality of nozzles being positioned on the cylindrical portion; and
an inertial collector in the housing downstream of the plurality of nozzles, the inertial collector causing a sharp directional change of the gas-liquid jets, thereby causing separation of liquid particles from the gas-liquid stream so as to produce the gas stream;
wherein the inertial collector comprises a porous collection substrate; and
wherein the nozzle structure and the inertial collector are configured to allow for full expansion of the plurality of gas-liquid jets.

2. The gas-liquid separator of claim 1, wherein the porous collection substrate has high permeability, thereby allowing the gas-liquid jets to penetrate the porous collection substrate.

3. The gas-liquid separator of claim 2, wherein the porous collection substrate comprises fibers of small diameter and has low packing density and the diameter and packing density of the fibers is selected so as to maintain high permeability of the porous collection substrate.

4. The gas-liquid separator of claim 3, wherein the porous collection substrate comprises at least one layer of fibers having low packing density upstream of at least one layer of fibers having high permeability.

5. The gas-liquid separator of claim 4, wherein the porous collection substrate comprises a low packing density nanofiber coating backed by a high permeability backing media.

6. The gas-liquid separator of claim 4, wherein the porous collection substrate comprises a plurality of layers of fibers, wherein the fiber diameter and packing density of each successive layer of fibers in the plurality of layers of fibers increase from a most upstream layer of fibers to a most downstream layer of fibers, and wherein the most downstream layer of fibers is backed by a high permeability backing media.

7. The gas-liquid separator of claim 1, wherein the porous collection substrate comprises oleophobic fibers, and the oleophobic fibers prevent saturation of the porous collection substrate with liquid particles.

8. The gas-liquid separator of claim 7, wherein the oleophobic fibers comprise an inherently oleophobic polymer.

9. The gas-liquid separator of claim 8, wherein the inherently oleophobic polymer comprises a fluorocarbon polymer.

10. The gas-liquid separator of claim 8, wherein the inherently oleophobic polymer comprises a hydrophobic polyester.

11. The gas-liquid separator of claim 8, wherein the inherently oleophobic polymer comprises a polysulfone.

12. The gas-liquid separator of claim 7, wherein the oleophobic fibers comprise a base polymer treated with an oleophobic coating.

13. The gas-liquid separator of claim 12, wherein the oleophobic coating is a fluorocarbon resin.

14. The gas-liquid separator of claim 12, wherein the oleophobic coating is a silicone resin.

15. The gas-liquid separator of claim 12, wherein the oleophobic coating is a surfactant.

16. The gas-liquid separator of claim 7, wherein the oleophobic fibers comprise plasma treated fibers.

17. The gas-liquid separator of claim 1, wherein individual nozzles of the first portion of the plurality of nozzles on the conical portion are radially aligned with individual nozzles of the second portion of the plurality of nozzles on the cylindrical portion.

18. The gas-liquid separator of claim 1, wherein the inertial collector comprises a plurality of spokes radiating from a central portion thereof, thereby creating a plurality of slots through the inertial collector.

19. The gas-liquid separator of claim 18, wherein the plurality of nozzles through the nozzle structure are aligned with the plurality of spokes of the inertial collector.

20. The gas-liquid separator of claim 1, wherein the porous collection substrate comprises fibers of small diameter and has low packing density and the porous collection substrate comprises oleophobic fibers.

21. The gas-liquid separator of claim 1, wherein the porous collection substrate comprises fibers of small diameter and has low packing density.

22. The gas-liquid separator of claim 1, the porous collection substrate comprises oleophobic fibers.

23. The gas-liquid separator of claim 1, wherein the porous collection substrate comprises fibers of small diameter and has low packing density and the porous collection substrate comprises oleophobic fibers.

24. An inertial gas-liquid separator, the gas-liquid separator comprising:
 a housing having an inlet for receiving a gas-liquid stream and an outlet for discharging a gas stream;
 a nozzle structure in the housing downstream of the inlet, the nozzle structure comprises a stepped configuration having a first plate on a first plane and second plate on a second plane, the first plane displaced from the second plane, the nozzle structure having a plurality of nozzles that receive the gas-liquid stream and accelerate the gas-liquid stream therethrough so as to create a plurality of gas-liquid jets, a first set of nozzles of the plurality of nozzles positioned on the first plate and a second set of nozzles of the plurality of nozzles positioned on the second plate, the nozzle structure comprises a third plate, the second plate and the third plate are located on either side of the first plate, the first plate is connected to the second and third plates by fourth and fifth plates extending perpendicularly to each of the first, second, and third plates; and
 an inertial collector in the housing downstream of the plurality of nozzles, the inertial collector causing a sharp directional change of the gas-liquid jets, thereby causing separation of liquid particles from the gas-liquid stream so as to produce the gas stream, the inertial collector comprises a stepped configuration that is offset from and corresponds to the stepped configuration of the nozzle structure;
 wherein the inertial collector comprises a porous collection substrate; and
 wherein the nozzle structure and the inertial collector are configured to allow for full expansion of the plurality of gas-liquid jets.

25. The gas-liquid separator of claim 24, wherein the inertial collector comprises:
 a first plate; and
 second and third plates located on either side of the first plate;
 wherein at least one slot is provided between the first plate and the second plate and between the first plate and the third plate.

26. The gas-liquid separator of claim 25, wherein the nozzle structure comprises one or more posts extending from the nozzle structure toward the inertial collector, wherein the posts extend adjacent the at least one slot and cause an additional sharp directional change in the gas-liquid stream before the gas-liquid stream exits the slots.

27. The gas-liquid separator of claim 24, wherein the inertial collector comprises:
 a first plate located on a first plane; and
 a second plate located on a second plane and radially outwardly the first plate;
 wherein at least one slot is provided between the first plate and the second plate.

28. The gas-liquid separator of claim 27, wherein the nozzle structure comprises one or more walls extending from the nozzle structure toward the inertial collector, wherein the walls extend adjacent the at least one slot and cause an additional sharp directional change in the gas-liquid stream before the gas-liquid stream exits the at least one slot.

\* \* \* \* \*